Oct. 12, 1926.
O. R. BRINEY
LOCK MEANS
Filed Sept. 10, 1924
1,603,022
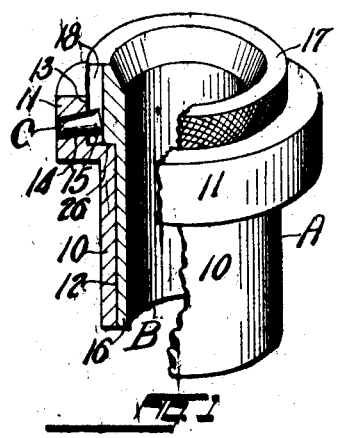
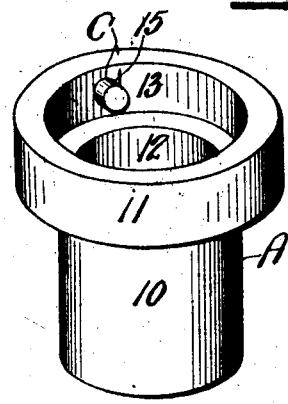 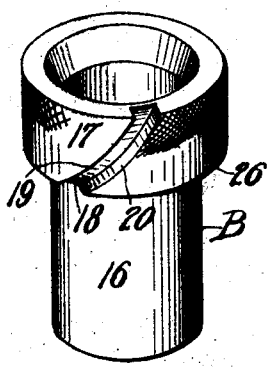
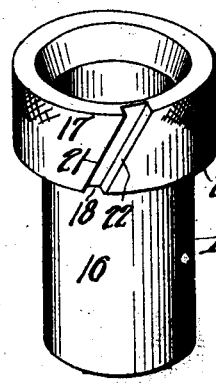 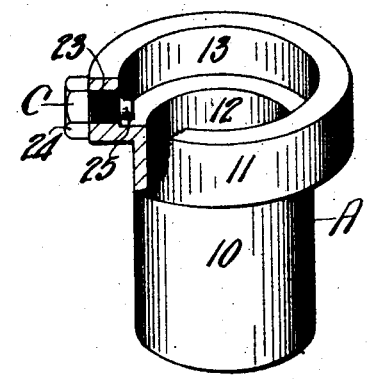
INVENTOR
*Ottis R. Briney*
BY
*C. T. Heinkel.*
ATTORNEY Patented Oct. 12, 1926.

1,603,022

UNITED STATES PATENT OFFICE.

OTTIS R. BRINEY, OF PONTIAC, MICHIGAN.

LOCK MEANS.

Application filed September 10, 1924. Serial No. 736,838.

My invention relates to lock means between members of such mechanisms as guide bushings in which one or more slip bushings are adapted to be inserted into or removed from and held in certain relation to a liner bushing.

The main object of my invention is a simple and inexpensive lock means in which members of a mechanism can readily be associated or disassociated without any auxiliary tools, which has few parts, in which the parts do not get out of order easily, in which repairs may be made easily when needed, and in which the most delicate parts are disposed on the inside of the structure to prevent injury thereto during use or abuse of the mechanism.

In guide bushings for instance it is essential that the slip bushing can readily be inserted into and removed from the liner bushing; that the guide bushing have the fewest possible parts; that these parts themselves are simple and economical of manufacture; and that a slight wedging or other similar engagement is provided between the parts to prevent the same from disengaging each other while the guide bushing is in operation but permit the ready removal of the slip bushing from the guide bushing when desired.

I attain the above object and advantages by the mechanisms illustrated in the accompanying drawing in which:

Fig. 1 is a perspective view, partly in section, showing a guide bushing embodying the features of my invention and comprising a slip bushing inserted into a liner bushing and a taper retainer pin.

Fig. 2 is a perspective view of the liner bushing of Fig. 1 showing the retainer pin projecting into the counterbore of the liner bushing.

Fig. 3 is a perspective view of the slip bushing of Fig. 1 showing an arcuate and angularly disposed groove in the outer circumferential surface of the head thereof.

Fig. 4 is a perspective view of a slip bushing similar to Fig. 3, showing a straight and angularly disposed groove in the outer circumferential surface of the head thereof.

Fig. 5 is a perspective view of a liner bushing, similar to Fig. 2, showing a modified retainer pin sectionally.

Similar reference characters refer to similar parts throughout the views.

The guide bushing shown in the accompanying drawing comprises the liner bushing A, the slip bushing B, and the retainer pin C.

The liner bushing A has the body 10, the head 11, the longitudinal bore 12 and the counterbore 13 at the upper end of the bore 12.

The retainer pin C shown in Fig. 1 comprises a taper pin having the portion 14 fitting into a corresponding taper hole in the wall of the head 11 with the small end of the pin toward the outside of the head and riveted over there into a slight countersink on the outside to firmly hold the pin in position. The portion 15 of the pin C projects into the counterbore 13. All of which is clearly seen in Figs. 1 and 2.

When the pin C is mounted in the head 11 as just described, it is held firmly in all directions and can easily be taken out, for repairs or otherwise, by chipping away the riveted portion and driving it out.

It is observed that the pin C of Fig. 1 is shown inclined to the transverse axis of the bushing. This is done to permit the taper reamer to ream the taper hole in the head 11 from the inside and clear the upper end of the head 11 on the opposite side. This inclined mounting of the pin C in no manner interferes with the purpose of the portion 15 as will be explained later.

The taper pin C may also be driven in from the outside of the head 11 and have the small end thereof project into the counterbore 13. This structure, however, has the disadvantage that the pin is held in one longitudinal direction only and may work loose in time and be pushed out and lost.

The slip bushing B has the body 16 fitting into the longitudinal bore 12 and the head 17 fitting loosely into the counterbore 13 and projecting some distance outside of the counterbore and is, preferably, knurled for convenience in taking hold of the slip bushing to remove the same from the liner bushing or to insert the same therein or to rotate the same therein.

The head 17 is provided with the groove 18 cut into the outer circumferential surface and is adapted to the portion 15 of the pin C.

The groove 17 may be straight and parallel with the longitudinal axis of the guide bushing, or curved or arcuate, or straight or curved and inclined or at an angle with the longitudinal axis of the guide bushing; the object of this groove is to engage the portion 15 to retain the slip bushing in desired relation to the liner bushing, but permit the ready removal or insertion of the slip bushing in the liner bushing.

In the structure shown in Figs. 1 and 3, the groove 18 is cut all the way across the head 17, has the sides 19 and 20 parallel with each other and arcuate and disposed at an angle with the longitudinal axis of the guide bushing as shown. This arcuate contour may be formed as a true arc of a circle or as compound arcs or of any other contour.

In Fig. 4 I have shown the groove 18 with the sides 21 and 22 parallel with each other and straight and disposed at an angle with the longitudinal axis of the guide bushing.

In Fig. 5 I have shown the pin C formed like a screw having the body 23 threaded into the head 11, the head 24 abutting the outside of the head 11 to lock the pin in position, and the pilot 25 projecting into the counterbore 13.

As to operation: When the bushing shown is in operation and a tool is rotating in the bore of the slip bushing, the portion 15 or 25 of the pin C engages the groove 18 and thereby prevents the slip bushing from rotating in one direction since the shoulder 26 of the head 17 rests on the bottom of the counterbore 13 and the slip bushing can not move longitudinally out of the liner bushing unless it is rotated in the opposite direction.

When it is desired to remove the slip bushing from the liner bushing, as when changing tools for instance, a rotary movement of the slip bushing causes the portion 15 or 25 to engage the side 19 or 21 and, due to the inclination or angular disposition thereof, moves the slip bushing partly out of the liner bushing until the end 26 of the head 17 is raised to the top of the portion 15 or 25 at which stage the slip bushing can be pulled straight out of the liner bushing.

When it is desired to insert the slip bushing into the liner bushing, insert the slip bushing into the liner bushing so that the lower end of the groove 18 coincides with the retainer pin, then give the slip bushing a rotative movement which causes the projecting portion of the retainer pin to engage side 19 or 21 and forces the slip bushing downward until the face 26 rests on the bottom of the counterbore 13 whereupon further rotation ceases and the slip bushing is retained in desired relation to the liner bushing.

It is observed that, in the structure shown in the drawing, the groove 18 is provided in the head of the slip bushing while the retainer pin is provided in the liner bushing. This arrangement can be reversed and the groove can be provided in the liner bushing while the retainer pin is provided in the slip bushing; either in the head as shown or in the body of the bushings when no heads are provided thereon.

The inclined groove has a particular advantage in that the action thereof on the projecting portion of the retainer pin always tends to hold the shoulder 26 down on the bottom of the counterbore when a tool is rotating in the slip bushing so that the top of the head of the liner bushing is always the same distance from the liner bushing and from the jig or other fixture in which the bushing is used to permit a depth stop on this tool to always abut the top of the head of the slip bushing at the same point of longitudinal travel of the tool to always bore a hole to the same depth.

The arcuate formation of the groove has the particular advantage of engaging the under side of the pin with more of a wedging action, longitudinally, and better rotative action, than a straight and inclined groove and thereby retains the bushings in relation to each other in a better manner than a straight and inclined groove could do. A further advantage of an arcuate groove over a straight groove is that the upper portion of the arcuate groove approaches more nearly to being parallel with the longitudinal axis of the bushings so that the wall 20 abuts the pin more squarely and thereby prevents the pin from wedging due to rotative movement between the bushings while the wall 20 of the lower portion of the arcuate groove extends arcuately under the pin and thereby holds the head 17 down on the bottom of the counterbore.

Modifications other than those pointed out and shown and described may be made within the scope of the appended claims; therefore, without limiting myself to the precise construction and arrangements of elements as shown and described,

I claim:—

1. In combination, associable members, one of said members being hollow, and a lock means between said members comprising, a lock pin having a taper portion seated in a taper hole through the wall of said one member, the diametrically largest portion of said taper on the inside of said wall, a portion of said lock pin extending into the hollow of said one member, the other of said members having a groove adapted to engage the extending portion of said pin and thereby lock said members to each other rotatively, and said groove having an arcuate course at an angle with the axis of said members to engage the extending portion of said pin near the bottom thereof and thereby lock said members to each other longitudinally.

2. In combination, associable members, one of said members having a bore, the other of said members adapted to said bore, and a lock means between said members comprising, a lock pin having one end thereof secured in the wall of said one member and the other end thereof extending into said bore, said other member having a groove engaging the extending end of said pin and thereby lock said members to each other, and said groove having an arcuate course at an angle with the axis of said members to engage the extending portion of said pin so that said other member is held longitudinally against said one member with more wedging action than the same is held rotatively in said one member.

3. A guide bushing comprising, a liner bushing having a bore and a counterbore, a slip bushing having a body adapted to said bore and a head adapted to said counterbore, and a lock means comprising, a lock pin having one end thereof secured in the wall of said counterbore and the other end thereof extending into said counterbore, the head of said other member having a groove adapted to engage the extending end of said pin and thereby lock said bushings to each other, and said groove having an arcuate course at an angle with the axis of the guide bushing to engage the extending end of said pin and thereby abut said head longitudinally on the bottom of said counterbore with more wedging action than said slip bushing is held rotatively in said liner bushing.

OTTIS R. BRINEY.